United States Patent [19]

Saunders

[11] Patent Number: 4,933,921

[45] **Date of Patent: * Jun. 12, 1990**

[54] SIGNAL REPRODUCING APPARATUS

[76] Inventor: Stuart D. Saunders, 24 Myrtly Street, Murwillumbah 2484, Australia

[ * ] Notice: The portion of the term of this patent subsequent to May 9, 2006 has been disclaimed.

[21] Appl. No.: 347,081

[22] Filed: May 4, 1989

Related U.S. Application Data

[63] Continuation of Ser. No. 42,613, Apr. 23, 1987, Pat. No. 4,829,500, which is a continuation of Ser. No. 619,144, filed as PCT AU83/00140 on Oct. 4, 1983, published as WO84/01479 on Apr. 12, 1984, abandoned.

[30] Foreign Application Priority Data

| | | | |
|---|---|---|---|
| Oct. 4, 1982 | [AU] | Australia | 6175 |
| Dec. 2, 1982 | [AU] | Australia | 7080 |
| Dec. 8, 1982 | [AU] | Australia | 7163 |
| Mar. 28, 1983 | [AU] | Australia | 8439 |
| Mar. 28, 1983 | [AU] | Australia | 8640 |
| Mar. 31, 1983 | [AU] | Australia | 8715 |

[51] Int. Cl.[5] .................... H04B 1/20

[52] U.S. Cl. .................... 369/5; 369/12; 369/76

[58] Field of Search .................... 369/1, 5, 12, 6, 7, 369/11, 69, 76; 360/137; 381/77, 78, 79; 455/66, 89, 90, 344, 349, 350, 351

[56] References Cited

U.S. PATENT DOCUMENTS 4,829,500 5/1989 Saunders .................... 369/5

*Primary Examiner*—Donald McElheny, Jr.
*Attorney, Agent, or Firm*—Sughrue, Mion, Zinn, Macpeak & Seas

[57] ABSTRACT

A portable wireless sound reproduction system includes a first portable housing having a sound signal receiving circuit and controls for processing the sound signal into two signals for transmission by two separate sound signal transmitters located in the same housing. A pair of speakers is detachably connected to the first housing and include receivers for receiving the wireless transmission of signals from the transmitters. The two speakers are adapted to be disposed in side-by-side relation with the first housing completely overlying and detachably connected to each of the speakers.

1 Claim, 4 Drawing Sheets

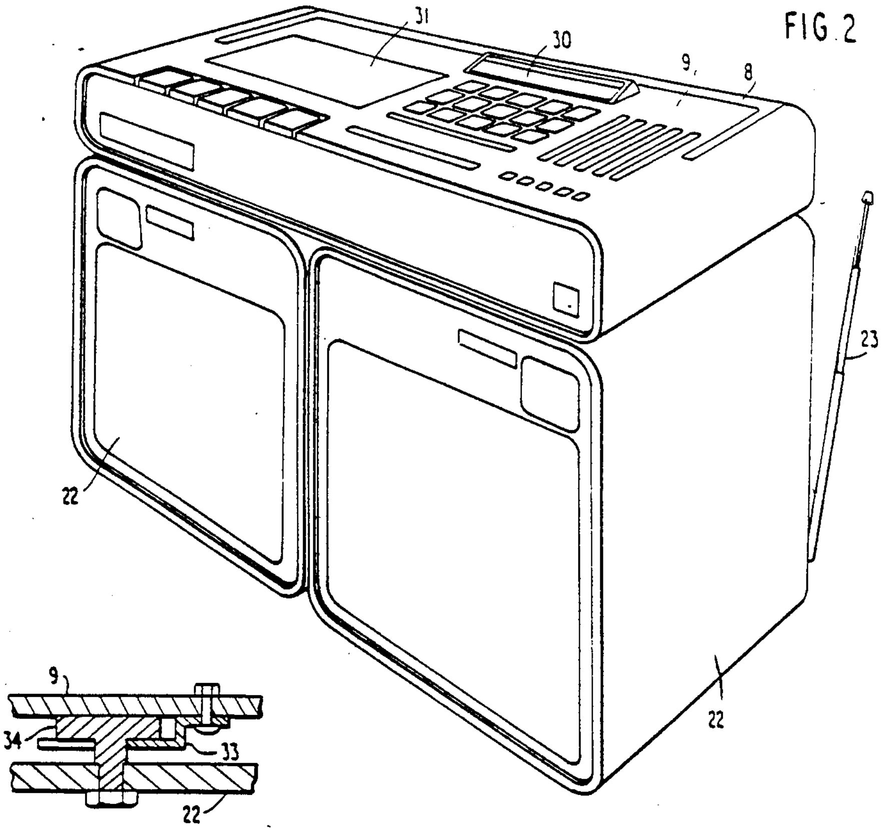
FIG. 2
FIG. 3C
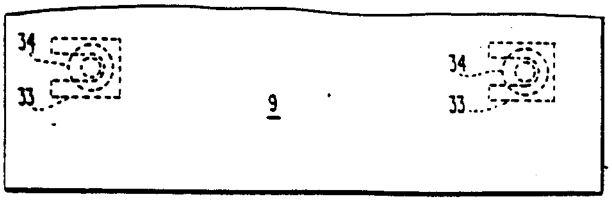
FIG. 3A
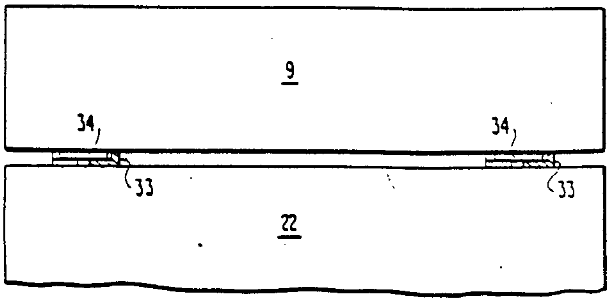
FIG. 3B

FIG.4
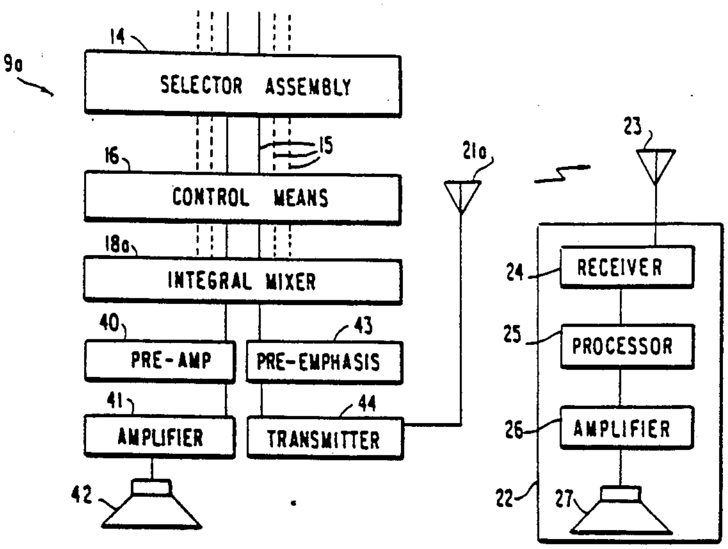
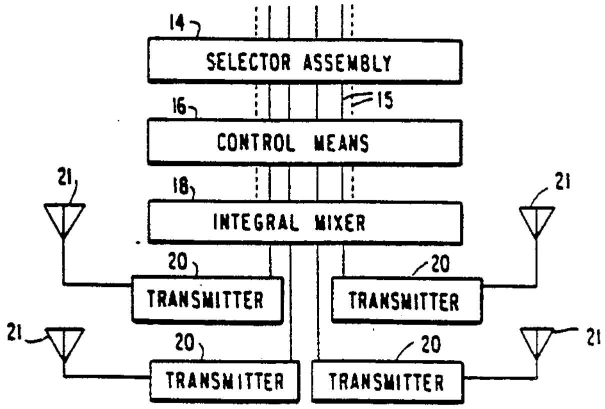
FIG.5

SIGNAL REPRODUCING APPARATUS

This is a continuation of application Ser. No. 042,613 filed Apr. 23, 1987, U.S. Pat. No. 4,829,500, which is a continuation of application Ser. No. 619,144, filed as PCT AU83/0014 on Oct. 4, 1983, published as WO84/01479 on Apr. 12, 1984, now abandoned.

This invention relates to improvements in electronic sound or image reproduction apparatus.

The quality of sound reproduction from electronic apparatus has greatly improved in recent times due in part to the advances in electronic technology and due to the use of multi-channel carrier signals or multiplexed broadcast signals which may be encoded for transmission and decoded by a receiver to provide a plurality of discrete signals for amplification and reproduction by separate speaker assemblies. The benefits of these systems are well known. The reproduction of music for example from such stereo systems more closely approaches the original sound particularly where the respective speaker assemblies can be widely separated to provide the appropriate stereo imagery.

To date remote speaker assemblies have been physically connected by cables to the amplifier and while this may not be a major disadvantage in fixed installations, it is sometimes difficult to conceal the interconnecting cable so that installation is untidy. Also to date such assemblies have included two separable speakers connected by extension leads to a central receiver/player. Such arrangements are cumbersome and expensive to produce. In addition, the placement of the cables may be hazardous. In portable installations the provision of wires interconnecting the amplifier and the speaker assemblies is cumbersome as the connection leads must be carried with the apparatus and of course the separation of the speaker assemblies is limited by the length of the connection leads. This inconvenience will generally preclude arrangement of the system to produce a stereophonic sound field in outdoor locations. The attaching cords will also preclude temporary relocation of the transmitter assembly or control unit to provide at hand convenience of control for the operator. Audio systems to date incorporating remote controls either corded or cordless are expensive and rely on the transmission of controlling signals to the receiver/player unit. Accordingly, as the receiver/player itself is not portable, operations including changing a recorded signal source such as turning over or replacing a record or cassette, are not possible from the remote control. A further disadvantage associated with conventional portable receiver/player amplification apparatus whether they provide stereo or mono reproduction, is that for economy and convenience the speaker assemblies are often integral with the receiver/player assembly so that in use the speaker assembly is usually located adjacent an operator in order that the operator may control the output thereof. Similar disadvantages occur in other conventional audio and audio visual apparatus.

The present invention aims to alleviate the above disadvantages and to provide electronic reproduction apparatus which will be reliable and efficient in use. Other objects and advantages of this invention will hereinafter become apparent.

With the foregoing and other objects in view, this invention in one aspect resides broadly in signal reproduction apparatus including a transmitter assembly adapted to receive signals to be reproduced and to provide a consequent transmission; a plurality of reproduction devices and associated receiving means for receiving and reproducing said transmission, and at least one of said receiving means being arranged for wireless reception of said transmission.

Preferably the reproduction device is a speaker assembly but of course other types of sound reproducing devices may be utilized as desired.

Preferably the transmitter assembly is provided with control means for controlling volume, balance, tone and/or equalization and the like whereby the output from the or each reproducing devices may be varied remotely by said control means. Of course the or each reproductive devices may also incorporate separate control means and if desired the control means may be selectively tuneable to receive the required transmission.

Furthermore, the transmitter assembly may include broadcast receiver or of course it could include an integral tape deck or record player, a digital audio disc or a video disc incorporating sound and video signals, and/or other signals sources as required.

The transmitter assembly preferably incorporates inputs for a plurality of such signals and selector means are provided whereby the required signal may be selected for transmission. When the signal to be received is a multi channel signal or a multiplexed stereo signal, one or more or each of the respective signals to be amplified and visually and audibly reproduced is transmitted by a respective wireless transmission means for reproduction by a respective reproduction device. In one form, one of the signals to be reproduced is amplified and then transmitted by connecting wires to a speaker assembly integral with the transmitter assembly and the other signal(s) is transmitted for wireless reception by speaker assembly remote from said transmitter assembly. In one embodiment the reproducing devices may be attached to the master receivers for portability and when so attached the transmission is fed directly from the transmitter assembly through connections formed between the transmitter assembly and the reproduction device(s).

The transmitter assembly may include processing means such as analogue to digital converter and/or encoder to provide suitable transmissions in analogue or digital form or otherwise as desired. Furthermore the transmitter assembly or the reproduction devices may include processing means providing artificial stereo by a technique such as phase delay and/or providing enhanced stereo or "stereo wide". Of course depending upon the form of the signal transmitted by the wireless transmission means the reproduction means may include a demodulator and a decoder to provide the appropriate signal for amplification and reproduction by a speaker. Furthermore the transmitter assembly may be provided with means for simultaneously receiving a plurality of signals and means for controlling and mixing said signals as required and means for independently transmitting said signals to any number of respective associated reproduction means.

In further aspect this invention resides broadly in a method of reproducing multi-channel or multi-plexed signals the method comprising relaying said signal to wireless transmission means to form a transmission for receipt and reproduction by reproduction devices.

In another aspect this invention aims to alleviate the disadvantages associated with prior configurations of multiple piece portable stereo reproduction apparatus by providing a two piece portable stereo receiver/- player assembly substantially as illustrated which will be easy to handle, and efficient in operation. The detachable speaker assembly can be connected to transmitter assembly by wireless transmission means according to further aspects of this invention or directly by leads as desired. Such connecting leads may be retractable for convenient operation. The two piece stereo will provide a form which is economical to produce and in which wide separation of the speakers can be achieved.

In order that the invention may be more readily understood and put into practical effect, reference will now be made to the accompanying drawings which illustrate preferred embodiments of the invention wherein:

FIG. 2 is a diagrammatic perspective view illustrating a preferred form of the apparatus made in accordance with the block diagram of FIG. 1;

Figure 6:
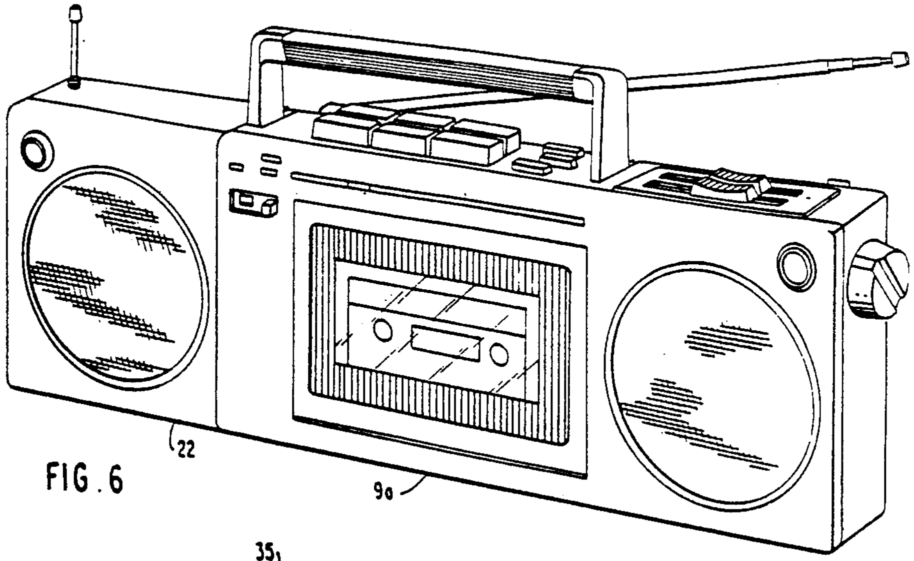
Figure 7:
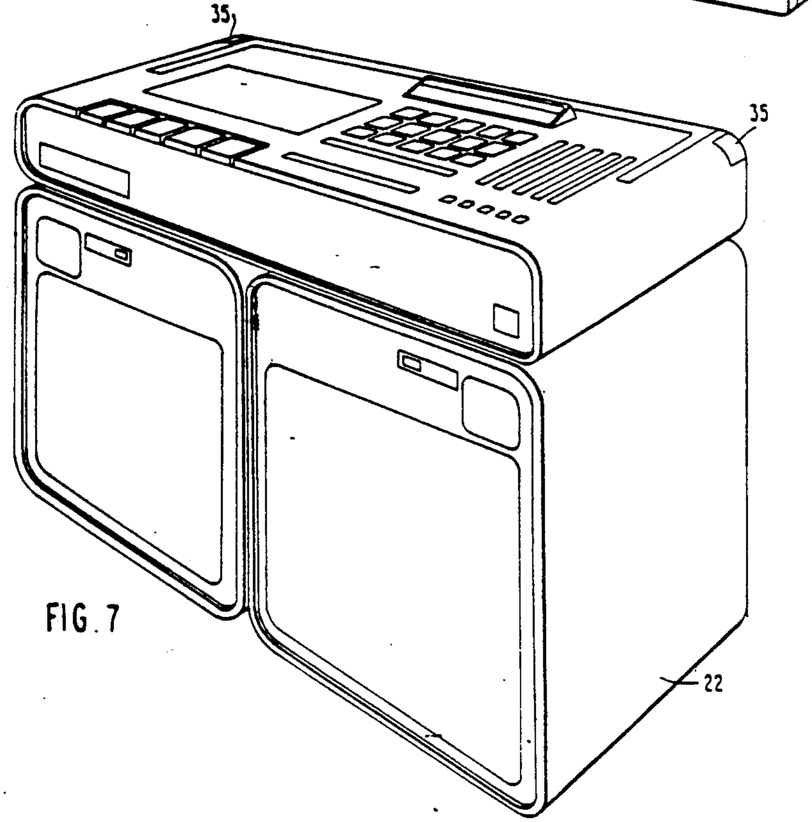

FIGS. 3(A–C) collectively illustrates in broken away plan, side elevation and expanded cross-sectional view of a typical connection between the transmitter and a speaker assembly;

FIG. 4 is a block diagram illustrating an alternate form of the invention in which only one channel of a signal is broadcast by a remote speaker assembly;

FIG. 5 is a block diagram illustrating a further embodiment of the invention;

FIG. 6 is a diagrammatic perspective view of signal reproduction apparatus made in accordance with the block diagram of FIG. 4, and FIG. 7 is a diagrammatic perspective of a preferred form of the invention similar to FIG. 2, but utilizing infra red transmission.

Figure 1:
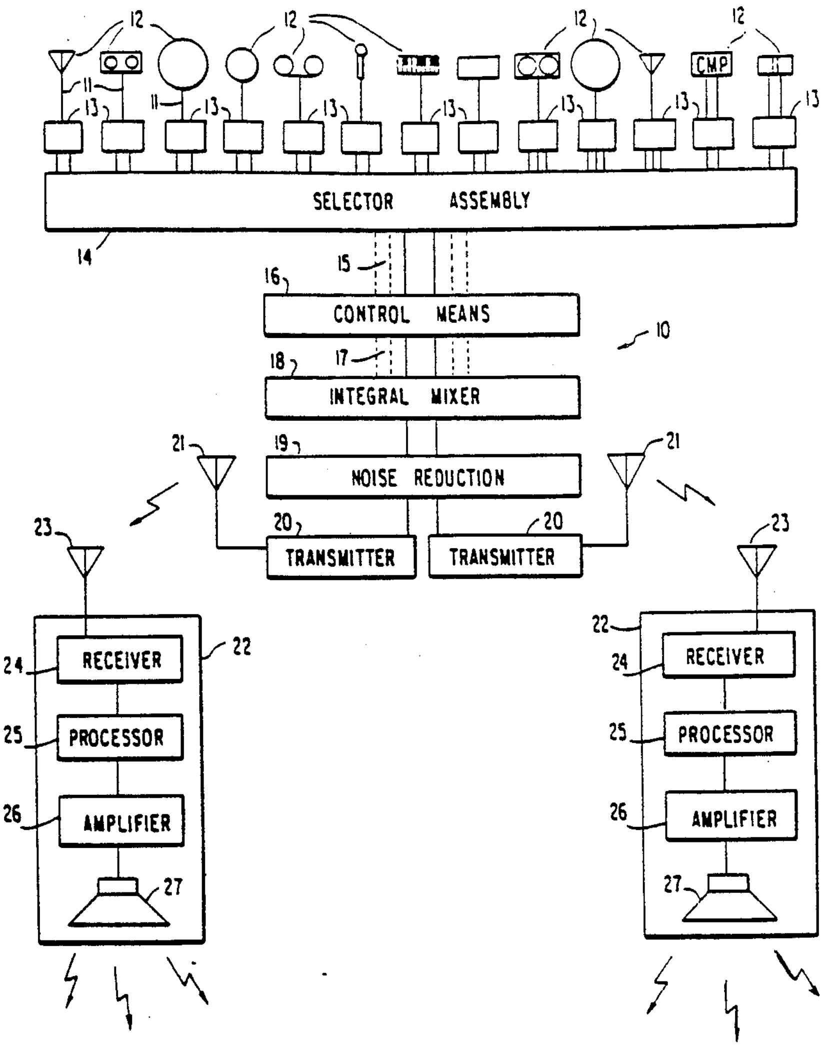
FIG. 1 is a block diagram illustrating one form of signal reproduction apparatus adapted for remote stereo reproduction.

The signal reproduction apparatus 10 illustrated in FIG. 1 is provided with a plurality of inputs 11 for connection to a number of integral or remote signal means 12. The input signals for the transmission may be for example, radio receiver, cassette player, record player, digital audio disc, reel to reel tape player, microphone, organ, synthesizer, video tape, video disc, T.V. broadcast receiver, computer and auxiliary input, or other signal means.

These signals are appropriately processed as required by processors 13 which may provide, for example, demodulation, decoding and de-emphasis for F M stereo, digital to analogue conversion for digital disc or digital cassette and/or impedance matching, and other processing as appropriate to signal means.

The required signal is selected by a selector assembly 14 so that the required input signal 15 may be fed to control means 16, having controls for balance, volume, tone, equalization or other aspects of the respective signals. Signals may be enhanced in the controller 16 to produce a stereo wide effect or monoaural signals may be processed to produce artificial stereo.

Controlled signals 17 may be mixed as required by integral mixer 18 and thence output signal is conducted via pre-emphasis or other noise reduction apparatus 19 if required, to be transmitted by respective transmitters 20 through aerials 21 at separate carrier frequencies to be received by the reproduction apparatus 22.

Transmissions from the aerials 21 are received through aerials 23, detected by receivers 24 and demodulated to produce an audio output which is de-emphasized in processors 25, amplified by amplifiers 26 and broadcast by speakers 27. This embodiment provides a cordless stereo player having centralised controls 16 which are operable to control the output of respective speaker assemblies 22 by controlling the respective localised transmissions thereto.

Alternatively, the output from the pre-emphasis or other noise reduction device 19 may be fed to a multiplexer which combines each pair of signals for a single signal input to the transmitter to be transmitted by a single aerial. In this embodiment, receiver assemblies are constructed such that received is decoded into left and right channels and each channel is reproduced by a respective speaker assembly.

In one form of this invention the transmitter assembly 9 forms one part of a three part assembly including a pair of speaker assemblies 22. FIGS. 2 and 3(A–C) illustrate one such configuration. The transmitter assembly 9 in this instance includes a radio broadcast receiver 30, a player 31 and the controlling and transmission means depicted in FIG. 1. The detachably secured speaker assemblies 22 each include a receiver tuned to receive a respective transmission from said transmitter assembly 9 so that each may be located remotely from one another and from the transmitted assembly 9 to provide stereophonic reproduction with full function remote control being provided by the transmitter assembly 9. A number of auxiliary inputs (not shown) may be provided on the transmitter assembly for connection of further signal producing means.

It will be seen that attachment members 33 are provided on the transmitter assembly 9. These co-operate with complementary members 34 on the speaker assemblies 22 to secure the three parts together. Alternatively the transmitter assembly and reproduction assemblies may be attached to each other by other means or located within or with respect to each other assembly by a further rigid or flexible housing or framework to facilitate portability. Electrical connectors may be provided for directly connecting transmitter assembly 9 to reproduction assemblies 22 for transmission of signal and/or power for use or recharging when assemblies are attached to each other, contained within framework or housing as referred to above.

The transmitter assembly 9 and the detachable speaker assemblies 22 are suitably self powered by batteries or other power source, such that each may be located at any selected position, within the transmission range of the transmitter assembly. The power output from this transmitter may be low but sufficient to ensure clear reception within a reasonable range. In use, the transmitter assembly 9 may be considerably below the eye level of the user, such as at a picnic, on a coffee table or on the beach. Accordingly, in this form of the invention, the location of the controls is on the top surface of the transmitter assembly 9 which is of squat proportions for improved stability in use and such that the speakers 22 are accomodated side by side when attached to the base of the transmitter assembly 9 for portability and or recharging of batteries. Portability is afforded by the fold-up handle 8 set into a recess about the controls.

In another embodiment of this invention shown in FIG. 4, one channel of the output from the mixer 18*a* is directed to a pre-amplifier 40 and then to amplifier 41 to be amplified and broadcast from integral speaker 42 and the other channel is directed via a pre-emphasis 43 to integral transmitter 44. The transmission from the aerial 21*a* is received through aerial 23 of a remote speaker assembly 22 which with its speaker 27 in combination with speaker 42 in the transmitter assembly 9*a*, broadcasts appropriate channels from the respective speakers to create a stereo sound field. In this embodiment many components correspond to components in the embodiment illustrated in FIG. 1 and are given like numerals.

A typical embodiment utilizing this circuitry is shown in FIG. 6. As illustrated the transmitter assembly 9*a* has a speaker assembly 22 detachably secured thereto for portability. When required the speaker assembly 22 is detached to be placed remote from the transmitter 9*a* to create a stereo sound field from a two piece cordless unit.

In a preferred embodiment, when the speaker assemblies are connected to the transmitter as illustrated in FIG. 2 and FIG. 6, power for recharging the batteries in the speaker assemblies 22 may be directed from main supply to the transmitter assembly 9 through electrical contacts between each unit. Suitably for this purpose the transmitter assembly 9 is adapted for battery power or for connection to mains supply. Alternatively the transmitter assembly 9 and reproducing assemblies 22 may each incorporate integral recharging circuits to recharge the batteries when the units are connected to a reticulated power supply. In another embodiment, the transmitter assembly 9 and the reproducing assemblies 22 may be equipped with external contacts which connect with contacts provided in a cradle in which the assemblies rest and from which the batteries are recharged when the cradles are connected to a suitable power supply. When a speaker assembly 9 is detached it will be seen that the cordless interconnection provides increased assemblies. The splitting of the signals for transmission may be prior to the preamplification or subsequent to amplification or elsewhere in the circuit of the transmitter assembly as desired. The split signal or signals can then be transmitted as a low powered signal at a suitable frequency which may be a frequency not required for conventional long distance or local broadcasting or inter-communication.

From the above it will be seen that this invention in one aspect provides means for transmitting a stereo signal for local broadcast to at least one remote speaker whereby the output from the or each remote speaker may be controlled from a single position on the transmitter assembly. In one preferred form the control is for balance between a remote speaker and a directly connected speaker together with common or respective tone, volume and other controls. In another preferred form, the central control for volume, balance and tone and other quality controls may be utilized for controlling the output of two speakers, both of which are not physically connected to the control means.

Provision may be made for the transmitter assembly and the speaker assemblies to be powered directly by mains supply, if and when convenient. Additionally this invention relates to audio-visual apparatus including extra receiving means and signal circuit(s) for video, sound and control means adapted to transmit to an auxiliary video receiver.

In another preferred embodiment illustrated in FIG. 7, the transmitter assembly 9 incorporates transmitters 35 such as infra red light emitting diodes which transmit a modulated signal to be received by suitable receivers 36 incorporated in the speaker assemblies, such signal being demodulated and amplified to control the output of said speaker assembly. Thus it can be seen that the term wireless transmission or wireless reception herein in relation to freedom of placement of both the transmitter assembly and the speaker assemblies which may be remote from an operator. The single centralised controls on the transmitter assembly provides effective control of the output from the remote speaker assemblies, effectively being a full function cordless remote control. The sound reproduced from the remote speakers may require tone or other settings different to the adjacent transmitter assembly 9 and of course these settings can be varied as desired on the transmitter assembly.

Alternatively, separate control signals may also be transmitted to the speaker assemblies for volume, and tone and/or other aspects of the signal in order to increase the dynamic signal to noise ratio. These control signals would within the speaker assemblies be used to control the required signal aspect. For this purpose the speaker assemblies would incorporate decoding means and further controlling means for receiving the control signal and controlling the output accordingly.

Of course the invention is not limited to use with two channel stereo signals and as illustrated in FIG. 5, four discrete signals may be provided as desired with associated detachable speaker assemblies. In another aspect, this invention provides automatic operation of detachable speaker assembly by providing an electronic or electro mechanical on/off relay which may be signal operated to actuate and switch the auxiliary receiver. In such instance a manual over-ride switch may be provided to switch the detachable speaker between off, standby and on. This may be switched to the standby position without supplying power to the amplifiers so that the associated receiver may be positioned remote from the transmitting assembly on standby ready to reproduce the transmission upon the appropriate signal being received. Also a conventional one piece stereo player may incorporate one or more transmitters for optional reproduction as desired by auxiliary cordless speaker transmission or reception of signals is not to be taken as a reference to radio transmission reception only but simply to any transmission or reception means not requiring wires for conducting the transmitted signal and it includes within its scope, transmission and reception by electromagnetic radiation, laser transmission or any other suitable form of transmission not requiring a physical connection.

It will of course be understood that the above has been given by way of illustrated example only and all such modifications and variations thereto as would be apparent to persons skilled in the art are deemed to fall within the broad scope and ambit of the present invention as is defined in the appended claims.

What is claimed is:

1. A portable wireless sound reproducing system comprising:

first portable housing means;

sound signal receiving means disposed in said first portable housing means for receiving sound signals from any suitable source;

sound signal control means disposed in said first housing means and connected to said sound signal receiving means for controlling and processing the sound signals received thereby into a signal suitable for transmission;

signal transmitting means disposed in said first housing means and connected to said control means for wireless transmission of said signal;

second portable housing means movable relative to said first housing means;

receiver means disposed in said second portable housing means for receiving said signal transmitted by said transmitting means and speaker means in said second portable housing means connected to said receiver means for converting said signal into an audio signal and broadcasting said audio signal wherein said control means in said first housing controls the output of said speaker means.

* * * * *